United States Patent [19]
Annis et al.

[11] Patent Number: 5,220,985
[45] Date of Patent: Jun. 22, 1993

[54] SHIFT RANGE SELECTION MECHANISM FOR AN AUTOMATIC TRANSMISSION

[75] Inventors: Robert E. Annis, Howell; Theodore E. Demers, Milford, both of Mich.

[73] Assignee: General Motors Corporation, Detroit, Mich.

[21] Appl. No.: 877,911

[22] Filed: May 4, 1992

[51] Int. Cl.⁵ .................. B60K 41/26; F16H 63/36; F16H 59/10
[52] U.S. Cl. ................. 192/4 A; 74/473 R; 74/483 R
[58] Field of Search .......... 192/4 A; 74/473 R, 483 R

[56] References Cited

U.S. PATENT DOCUMENTS

| | | | |
|---|---|---|---|
| 3,241,640 | 3/1966 | McCordic et al. | 192/4 A X |
| 3,361,234 | 1/1968 | Runyon | 192/4 A |
| 3,729,075 | 4/1973 | Piret | 192/4 A |

Primary Examiner—Allan D. Herrmann
Attorney, Agent, or Firm—Donald F. Scherer

[57] ABSTRACT

A drive range selection employs both a movable shift actuating member that is operatively connected to a customary manual shift valve and a movable park lock actuating member that is operatively connected to a parking lock pawl mechanism. A force transfer device operatively connects the shift actuating member and the park lock actuating member to a selecting lever. Mechanism is provided to disengage the force transfer device from the shift actuating member when the force transfer device is operatively connected to the park actuating member, and to immobilize the shift actuating member in response to activation of the park lock actuating member when the force transfer device is disengaged from the shift actuating member. Provision is further made not only to disengage the force transfer device from the park lock actuating member when the force transfer device is operatively connected to the shift actuating member, but also to preclude movement of the park actuating member when the force transfer device is operatively connected to the shift actuating member. As such, when the selecting lever is placed in the park position by the vehicle operator, none of the drive ratios of the transmission are engageable. Rather, they are disengaged from the shift selecting member until such time as the operator removes said selecting lever from the park position. Conversely, when the selecting lever is in neutral or any one of the drive ranges, the park lock actuating mechanism cannot be activated.

14 Claims, 6 Drawing Sheets

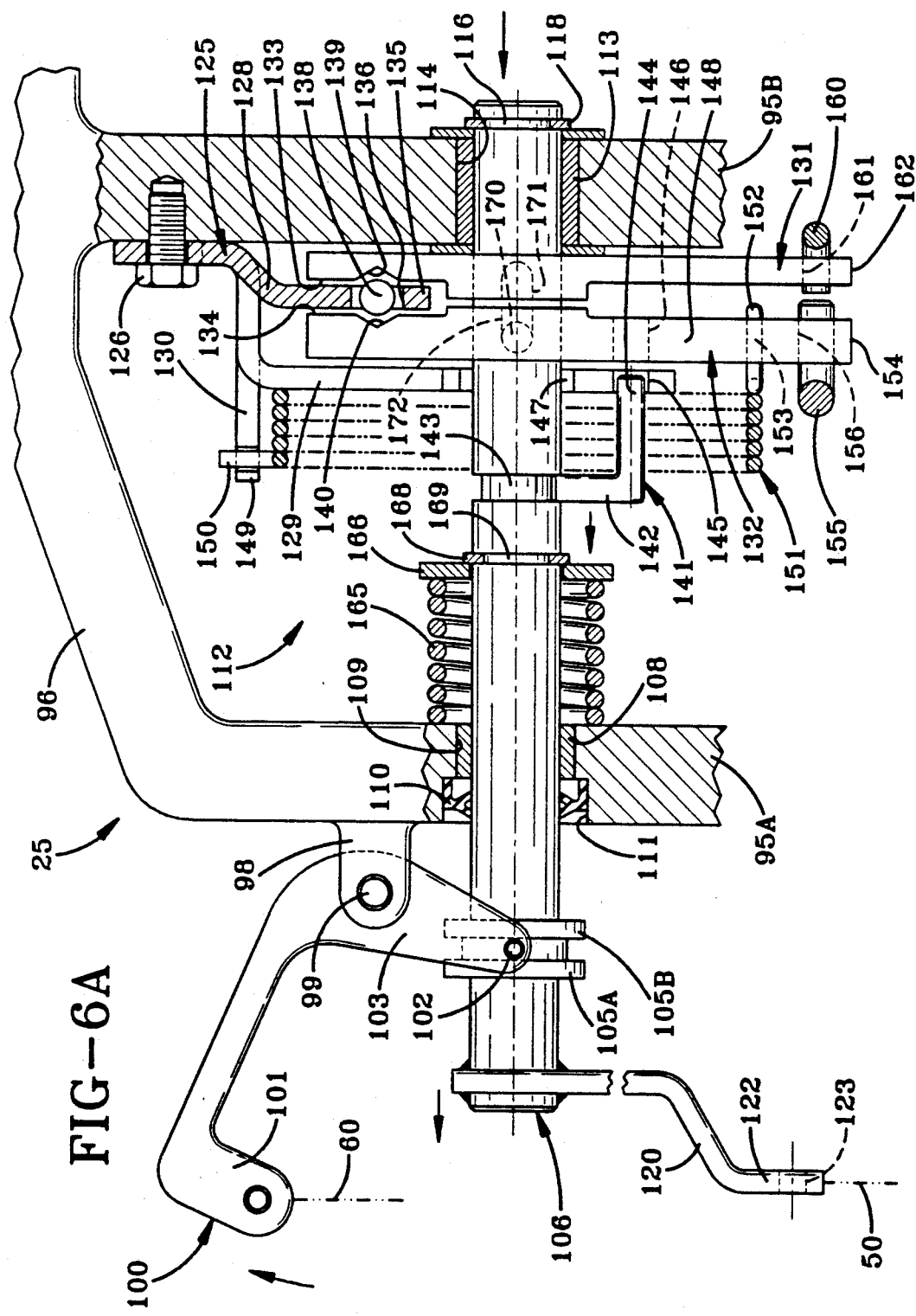

US 5,220,985

SHIFT RANGE SELECTION MECHANISM FOR AN AUTOMATIC TRANSMISSION

TECHNICAL FIELD

The present invention relates generally to vehicular transmissions. More particularly, the present invention relates to a drive range selection assembly for use in conjunction with a vehicular transmission. Specifically, the present invention relates to a drive range selection assembly incorporating a new and novel means by which to disconnect and secure the shift actuating member when the park lock actuating member has been activated and, conversely, to disconnect and secure the park lock actuating member when the shift actuating member has been activated.

BACKGROUND OF THE INVENTION

Drive range selection assemblies for vehicular transmissions are not per se new. Drive range selection assemblies have historically been employed to effect control of the transmission by the vehicle operator. The shift actuating assembly is generally located on or in close proximity to the transmission, but the manually operated selector assembly, which is controlled by the vehicle operator, may be located in close proximity to or be remote from the shift actuating assembly. In either situation, the composite drive range selection assembly effects the desired operative connection between the vehicle operator and the transmission of the vehicle.

One popular prior art approach is to include a conventional rooster comb in the shift actuating assembly that presents a plurality of alternatingly spaced cam lobes and valleys that are engageable by a spring-loaded detent roller. The detent roller is adapted to be confined in predetermined valleys to actuate a manual selector valve to the degree required to provide the selected drive range.

As a general rule, the cam lobe between the valleys, which delineate the adjacent reverse and the park positions of the shift mechanism, is higher than the other cam lobes, not only to provide a tactile indication sufficient to identify movement therebetween, but also to retain the roller detent in the valley which effects activation of the park lock pawl unless an additional force is applied to the selecting lever. In addition, the lobe between the park and reverse valleys is generally skewed toward the park valley in order not only to enhance movement into the park valley but also to tend to retain the roller detent within the park valley.

Prior arrangements have also tended to locate the park position adjacent the reverse position.

SUMMARY OF THE INVENTION

It is therefore a primary object of the present invention to provide a drive range selection assembly which provides a positive separation between the shift actuator and the park lock actuator.

It is another object of the present invention to provide a drive range selection assembly, as above, wherein positive separation is effected, at least in part, by disconnecting the shift actuator from the selecting lever whenever the park lock actuator is operatively connected to the selecting lever.

It is a further object of the present invention to provide a drive range selection assembly, as above, wherein positive separation is effected, at least in part, by disconnecting the park lock actuator from the selecting lever whenever the shift actuator is operatively connected to the selecting lever.

It is a still further object of the present invention to provide a drive range selection mechanism, as above, wherein positive separation is effected, at least in part, by immobilizing the shift actuator when the park lock actuator is activated.

It is yet another object of the present invention to provide a drive range selection assembly, as above, wherein positive separation precludes activation of the park lock actuator whenever the shift actuator is operatively connected to the selecting lever.

It is an even further object of the present invention to provide a drive range selection mechanism, as above, whereby one can actuate the park lock actuator from neutral, without being required to move the selecting lever through the reverse shift range, if desired.

These and other objects of the invention, as well as the advantages thereof over existing and prior art forms, which will be apparent in view of the following detailed specification, are accomplished by means hereinafter described and claimed.

In general, a drive range selection assembly embodying the concepts of the present invention employs a shift actuator that is operatively connected to a customary manual shift valve. A park lock actuator is operatively connected to a park locking pawl mechanism. Force transfer means are operatively connected to the shift actuator and to the park lock actuator to effect selective movement thereof in response to manipulation of a selecting lever.

Mechanism is provided to disengage the force transfer means from the shift actuator when the force transfer means is operatively connected to the park actuator. Mechanism is also provided to immobilize the shift actuator in response to activation of the park lock actuator when the force transfer means is disengaged from the shift actuator.

Provision is further made to disengage the force transfer means from the park lock actuator when the force transfer means is operatively connected to the shift actuator. In addition, mechanism is provided to preclude movement of the park actuator when the force transfer device is operatively connected to the shift actuator.

As such, when the selecting lever is placed in the "park" position by the vehicle operator, none of the drive ratios of the transmission are engageable. Rather, they are disengaged from the shift selecting member until such time as the operator removes said selecting lever from the park position. Conversely, when the selecting lever is in neutral or any one of the drive ranges, the park lock actuator can not be activated.

A drive range selection assembly embodying the concepts of the present invention is shown and described in sufficient detail to effect a full disclosure of the subject invention. The exemplary drive range selection assembly is described in detail without attempting to show all of the various forms and modifications in which the invention might be embodied; the invention being measured by the appended claims and not by the details of the specification.

BRIEF DESCRIPTION OF THE DRAWINGS

FIG. 6A is a view similar to FIG. 6, but with the s shaft having been axially translated to permit engagement of the park lock actuator in response to rotation of the shift shaft.

DESCRIPTION OF AN EXEMPLARY EMBODIMENT

Figure 5:
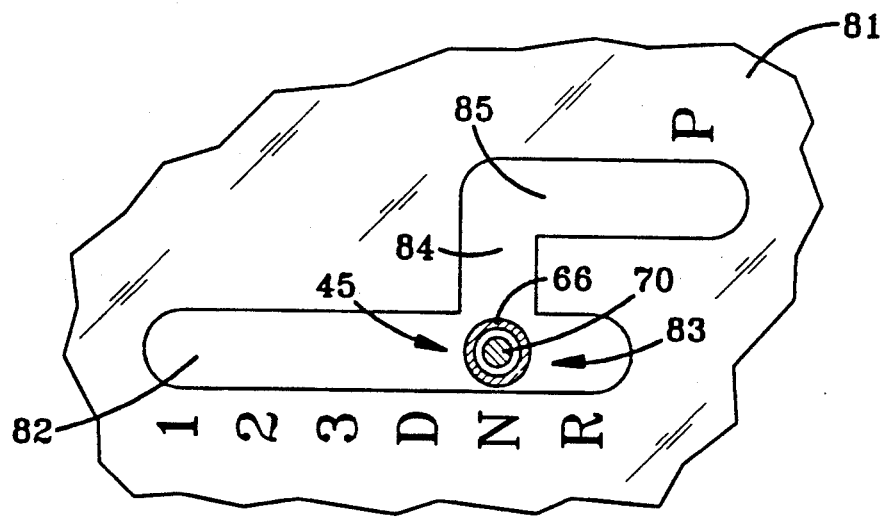
FIG. 5 is also an enlarged transverse section taken substantially along line 5—5 of FIG. 1, but appearing on the same sheet of drawings as FIG. 2 to depict the interaction of the selecting lever with a gate plate.
Figure 6:
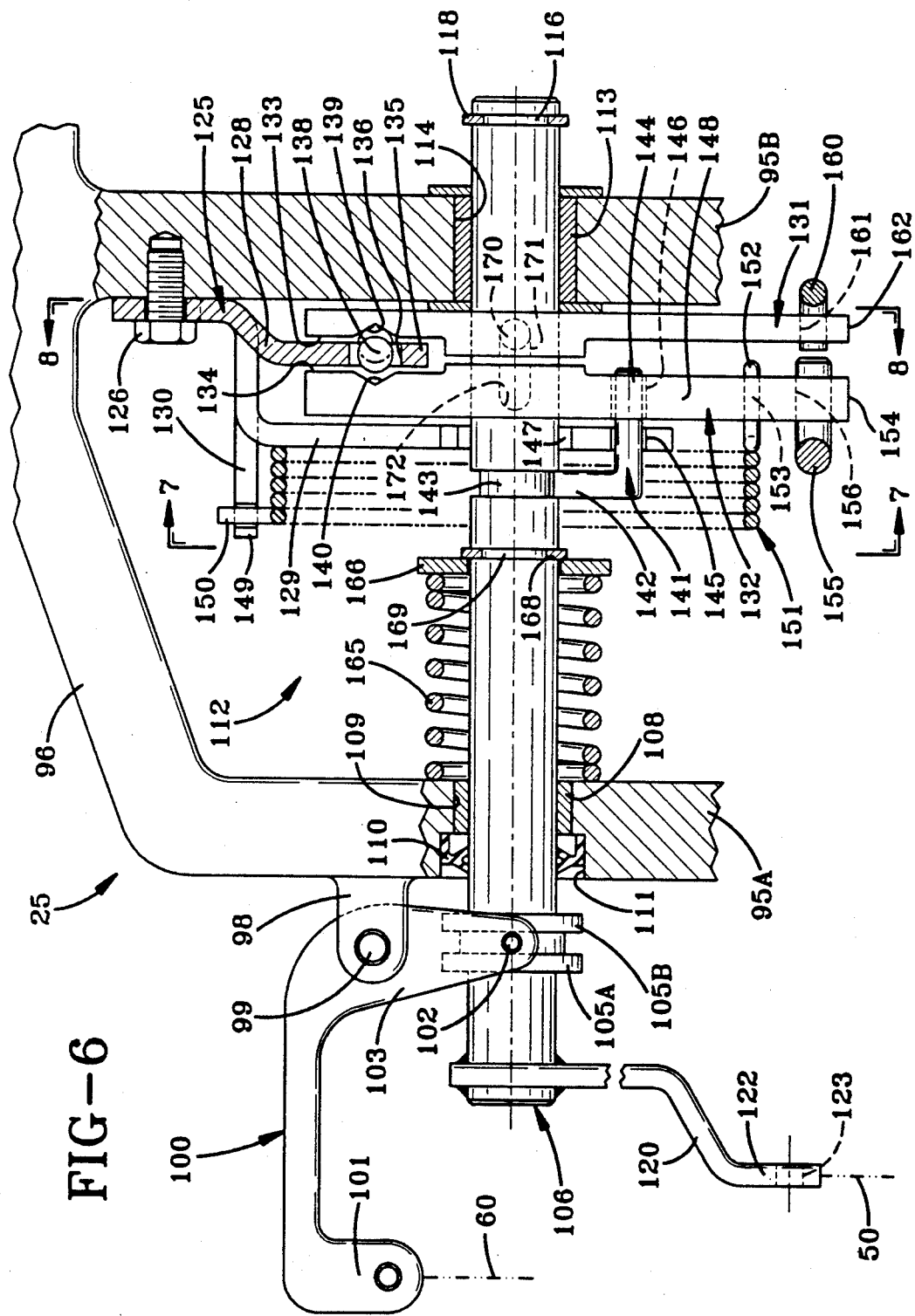
FIG. 6 is a side elevation, partly broken away, of an actuating subassembly that may be incorporated in the drive range selection assembly embodying the concepts of the present invention and with a shift shaft axially disposed to permit drive range selection in response to rotation of the shift shaft.
Figure 8:
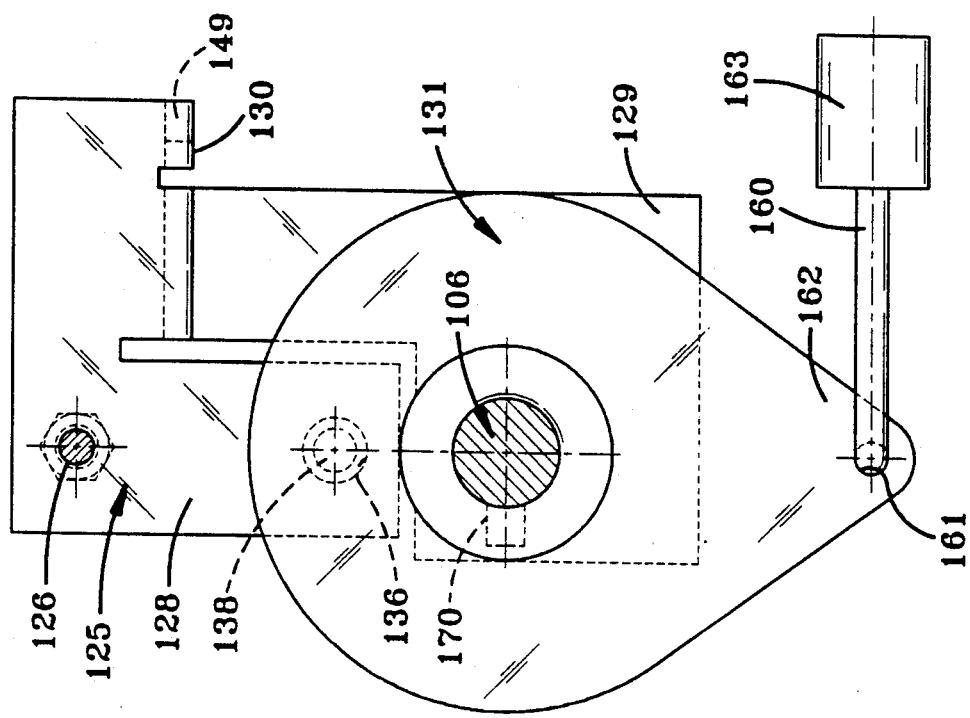
FIG. 8 is also a vertical section but taken substantially along line 8—8 of FIG. 6 to depict a drive range actuating plate in elevation.
Figure 7:
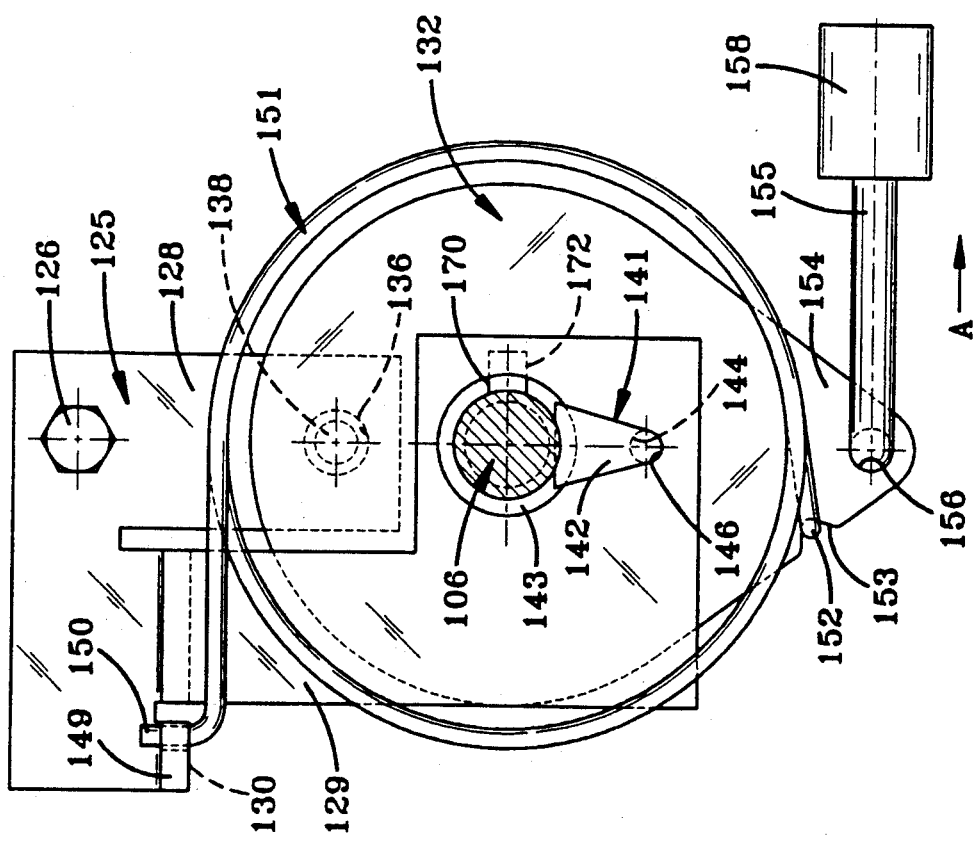
FIG. 7 is a vertical section taken substantially along line 7—7 of FIG. 6 to depict a park lock actuating plate in elevation.

A drive range selection assembly embodying the concepts of the present invention is identified generally by the number 10, and the drive range selection assembly 10 incorporates two subassemblies—viz., a manually operated selector subassembly, identified generally by the numeral 20, that is depicted in detail in FIGS. 1 through 5; and, an actuating subassembly, identified generally by the numeral 25, that is depicted in detail in FIGS. 6 through 8. Inasmuch as the selector subassembly 20 and the actuating subassembly are depicted as being operatively interconnected solely by virtue of two force transfer devices, as will be hereinafter more fully understood, there is no need to show both subassemblies 20 and 25 on the same sheet of drawings, even though they compositely constitute the drive range selection assembly 10.

Figures 1, 3:
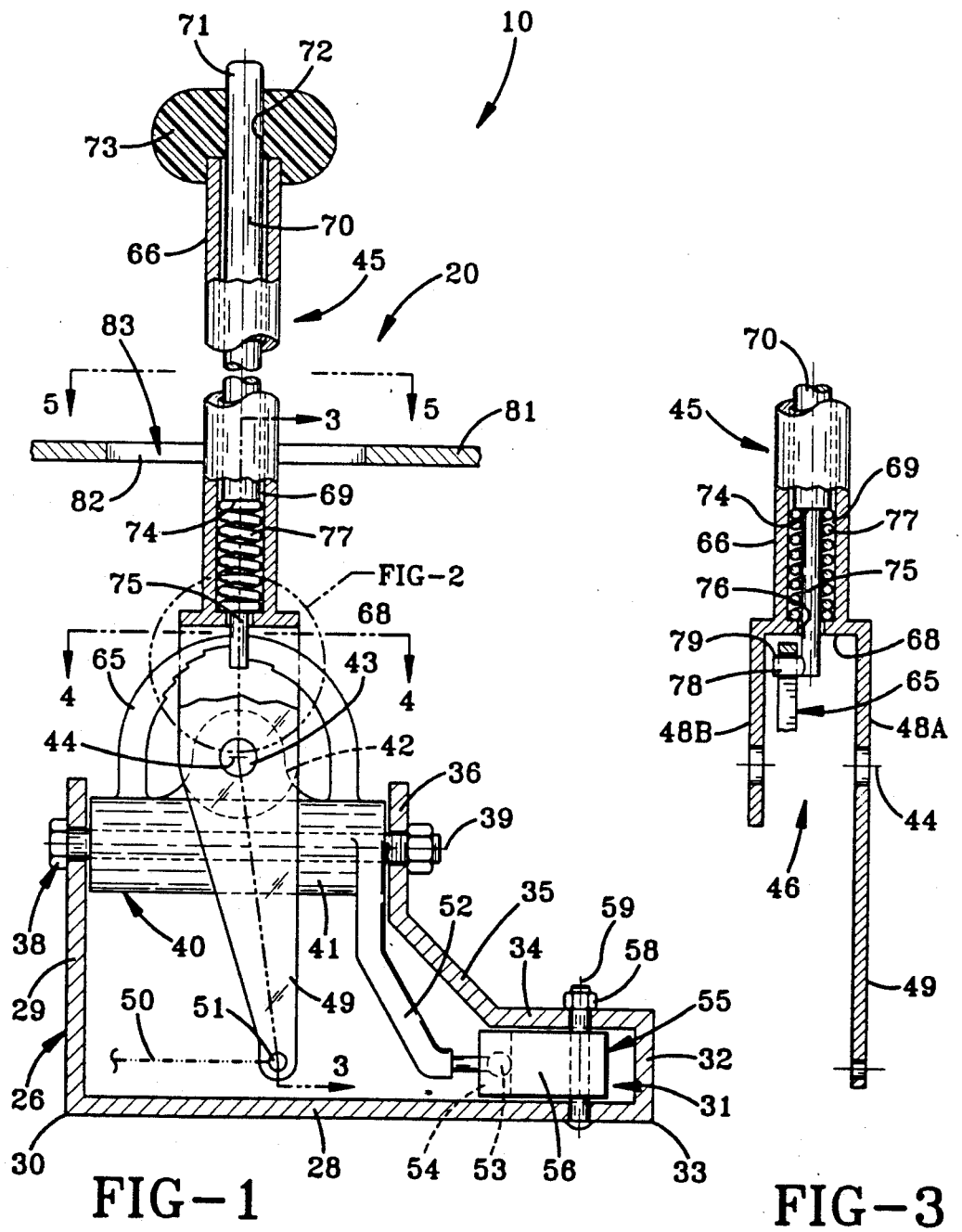
FIG. 1 is a side elevation, partly broken away, of a representative selector subassembly that may be incorporated in a drive range selection assembly embodying the concepts of the present invention.
FIG. 3 is a vertical section taken substantially along line 3—3 of FIG. 1, and appearing on the same sheet of drawings as FIG. 1 to depict the interrelation of a range identifying pawl with the range delimiting detents in a cam arch incorporated in the selector subassembly.

As best seen in FIG. 1, the selector subassembly 20 is supported by a tower frame 26 that is readily adapted to be located in convenient proximity to the operator of the vehicle in which the drive range selection assembly 10 is incorporated. The tower frame 26 has a base 28, which may be a plate with a first gudgeon 29, which may also be a plate extending upwardly from one lateral edge 30 of the base 28. A channel 31 is provided in spaced opposition to the gudgeon 29. The channel 31 is formed by a plate-like spacer 32 that extends upwardly from the other lateral edge 33 of the base 28 to terminate in a plate-like top member 34 that extends outwardly from the spacer 32 in substantially parallel relation to the base 28. A transition plate 35 extends obliquely upwardly from the top member 34 and terminates in a second gudgeon 36 that is disposed in parallel spaced relation with respect to the first gudgeon 29.

A first axle 38, which may comprise a nut and bolt combination, is supported from and extends between the laterally spaced substantially parallel first and second gudgeons 29 and 36. The first axle 36 defines a first axis 39 and constitutes the support upon which a knuckle assembly 40 is rotatably mounted. The knuckle assembly 40 presents a pair of orthogonally disposed generally cylindrical bearing blocks 41 and 42. Bearing block 41 rotatably receives the axle 38. The knuckle assembly 40 is, therefore, rotatable about the first axis 39 by virtue of the interaction between the first bearing block and the axle 38.

A second axle 43 (FIG. 4), which may also comprise a nut and bolt combination, is rotatably received within the second bearing block 42 to define a second axis 44 that is orthogonally disposed with respect to the first axis 39. The second axle 43 supports a selecting lever 45 (FIG. 1). The lower end portion of the selecting lever 45 presents a clevis 46 (FIG. 3). The laterally spaced arms 48A and 48B of the clevis 46 are supported by the second axle 43 in order to permit the selecting lever 45 to be selectively rotatable relative to the knuckle assembly 40 about the second axis 44. Pivotal movement of the selecting lever 45 about the second axis 44 is hereinafter arbitrarily designated as longitudinal movement of the selecting lever 45.

In the detailed description which follows and as previewed in the previous paragraph, a particular structural member, component or arrangement may be employed at more than one location. When referring generally to that type of structural member, component or arrangement, a common numerical designation shall be employed. However, when one of the structural members, components or arrangements so identified is to be individually identified, it shall be referenced by virtue of a letter suffix employed in combination with the numerical designation employed for general identification of that structural member, component or arrangement. Thus, there are at least two laterally spaced clevis arms which are generally identified by the numeral 48, but the specific individual clevis arms are, therefore, identified as 48A and 48B in the specification and on the drawings. This same suffix convention shall be employed throughout the specification.

The interaction of the selecting lever 45, the knuckle assembly 40 and the tower frame 26 also permits the selecting lever 44 to be selectively rotatable with the knuckle assembly 40 about the first axis 39. Pivotal movement of the selecting lever 45 about the first axis 39 is hereinafter arbitrarily designated as lateral movement of the selecting lever 45.

A throw arm 49 extends outwardly from and as an extension of clevis arm 48A. Inasmuch as rotation of the throw arm 49 about the second axis 44 is effected by rotation of the selecting lever 45 about the same second axis 44, the throw arm 49 will, for consistency, hereinafter arbitrarily be designated as the longitudinal throw arm. A first force transfer device 50—which may comprise a link arm, a push-pull control cable or other arrangement capable of transferring either tensile or compressive forces—is operatively secured to the distal end portion of the throw arm 49, as at 51.

A throw arm 52 extends outwardly from the first bearing block 41 to be angularly displaced in response to lateral movement of the selecting lever 45. For continued consistency the throw arm 52 will, because it moves about the first axis 39 in response to lateral movement of the selecting lever 45 about the same first axis 39, be hereinafter designated as the lateral throw arm 52. The distal end portion of the lateral throw arm 52 terminates in a ball 53 that interacts with a reaction slot 54 incised into the outboard end of the input leg 56 of a preferably L-shaped first rocker 55. The first rocker 55 is rotatably mounted on a third axle 58, which may also comprise a nut and bolt combination. The third axle 58 extends between the base 28 and the top member 34 so that the first rocker 55 is received within the channel 31. The third axle 58 thus defines a third axis 59 that is perpendicular to both the first and second axes 39 and 44. As shown, the first and second axes 39 and 44 need not intersect each other nor need they intersect the third axis 59.

Figure 4:
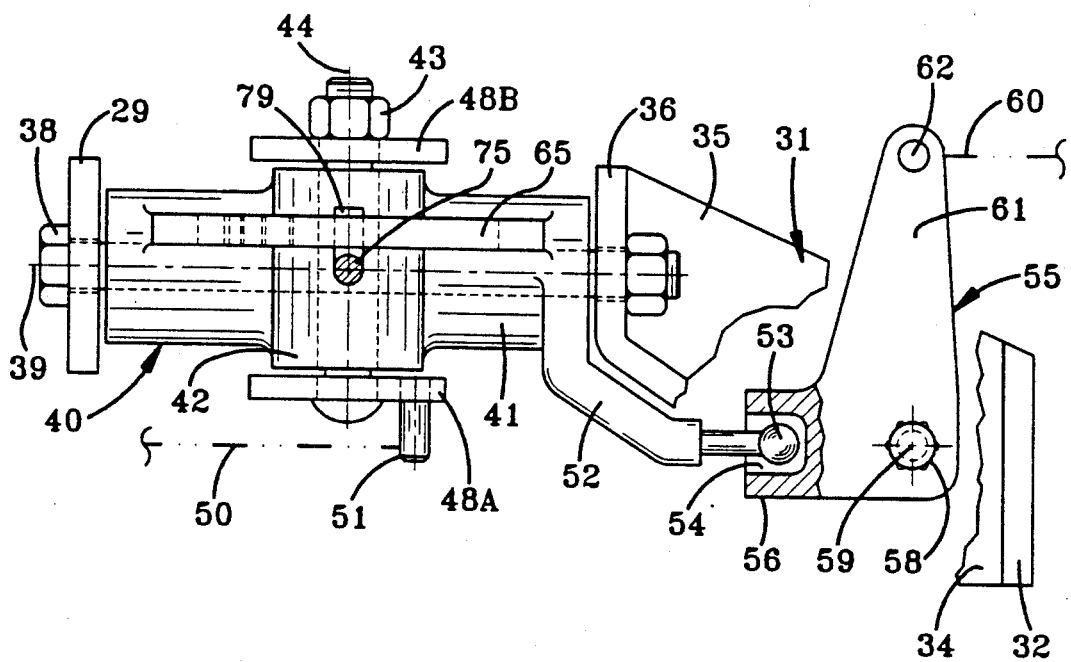
FIG. 4 is an enlarged transverse section taken substantially along line 4—4 of FIG. 1 to depict a knuckle assembly in the selector subassembly, which is manipulated by the selecting lever in top plan and with the input rocker disposed to permit drive range selection by longitudinal rotation of a selecting lever.
Figure 4A:
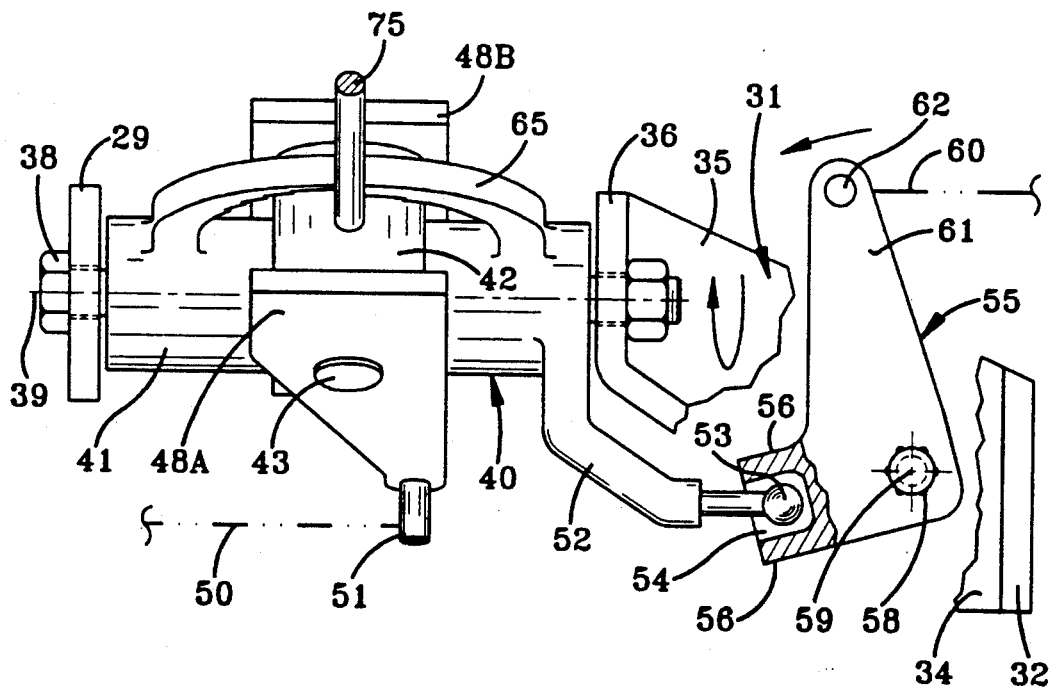
FIG. 4A is similar to FIG. 4, but with the knuckle assembly having been manipulated by lateral movement of the selecting lever to pivot the input rocker so as to effect a disconnection of the drive range actuating mechanism from the selecting lever and permit longitudinal rotation of the selecting lever selectively to actuate the park lock actuating mechanism.

As best seen in FIGS. 4 and 4A, a second force transfer device 60—which may also comprise a link arm, a push-pull control cable or other arrangement capable of transferring either tensile or compressive forces—is operatively secured to the distal end portion of the output leg 61 on the first rocker 55, as at 62.

A detent arch 65 (FIGS. 1 and 2), which is preferably disposed within a vertical plane through the first axis 39, extends upwardly from the first bearing block 41 in knuckle assembly 40 to be disposed transversely of the second bearing block 42. As best seen in FIG. 3, the detent arch 65 is disposed between the clevis arms 48. The selecting lever 45 includes a hollow preferably cylindrical barrel portion 66 that extends upwardly from the cross plate 68 which defines the base of the clevis 46. The hollow interior 69 of the barrel portion 66 slidably receives a release shaft 70. The upper end of the release shaft 70 terminates in a button portion 71 that extends through a bore 72 in the knob 73 supported by the barrel portion 66 of the selecting lever 45 in order to be readily accessible to the operator of the vehicle. The lower end portion of release shaft 70 has a downwardly directed shoulder 74 that surrounds an axial extension 75 of the release shaft 70. The shoulder 74 may, as depicted, result by virtue of the fact that the extension 75 is of lesser diameter than the shaft 70.

Figure 2:
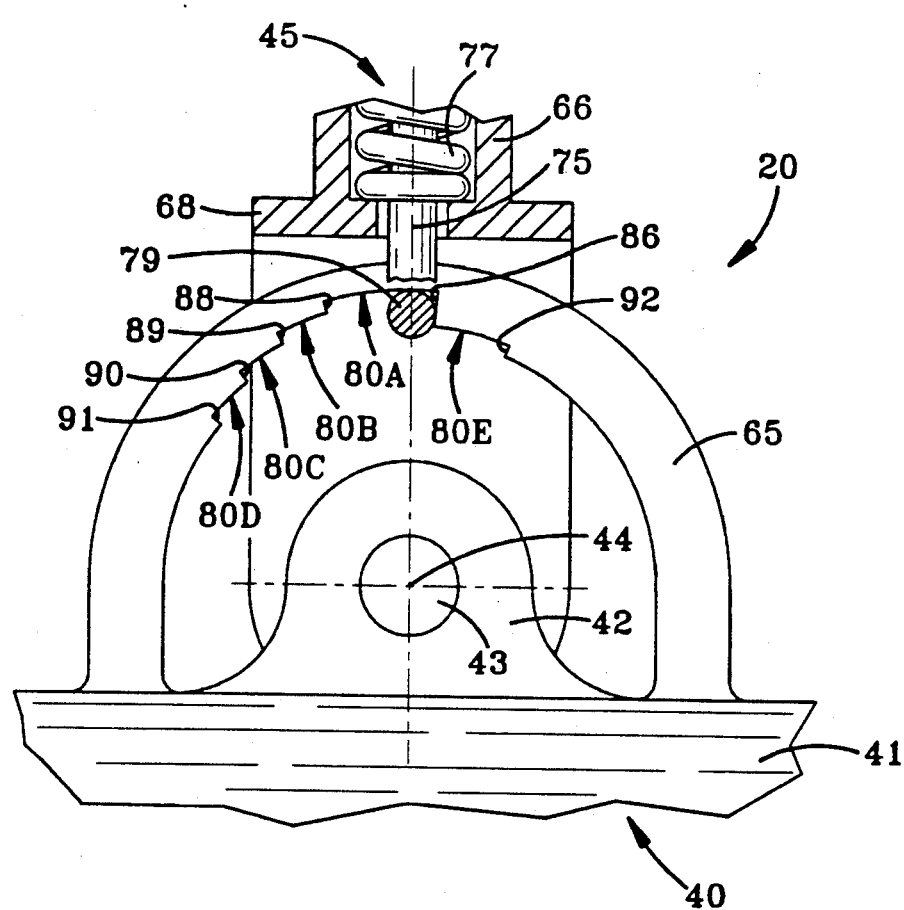
FIG. 2 is an enlarged area of FIG. 1, the area being defined by the dotted circle in FIG. 1

The axial extension 75 passes through a bore 76 in the cross plate 68 to lie laterally adjacent to the detent arch 65. An offset arm 78, as best seen in FIG. 3, extends transversely outwardly from the extension 75. The outer surface of the offset arm comprises a pawl 79 which is adapted selectively to engage the progressive plurality of detent recesses 80 (which are best seen in FIG. 2) presented from the detent arch 65. A compression spring 77 surrounds the axial extension 75 with one end reacting against the shoulder 74 and the other end reacting against the cross plate 68 in such a way as to bias the pawl 79 against whichever detent recess 80 it is opposingly disposed. The interaction of the pawl 79 with the detent arch 65 not only defines the location of the selecting lever 45 to achieve each shift range but also serves as a tactile range delineator. Both functions will be hereinafter more fully described.

The selecting lever 45 extends through a typical gate plate 81 (FIG. 5). A first portion 82 of the gate plate aperture 83 delineates a longitudinal path through which the selecting lever 45 may be moved to select the neutral, the four forward and the reverse drive ranges, which may be identified with the customary alphanumeric designations "N", "D", "3", "2", "1" and "R", respectively. A lateral portion 84 of the gate plate aperture 83 communicates between the first longitudinal portion 82 and a second longitudinal portion 85 thereof. The park position is achieved when the selecting lever 45 is appropriately positioned within the second longitudinal portion 85, as identified by the typical alphanumeric designation "P".

To conclude the structural description of the selector subassembly 20, it can be best seen in FIG. 2 that the detent recess 80A presents a first shoulder 86 which defines the neutral position "N" and a second shoulder 88 which defines the full forward drive range "D". Detent recess 80B presents a shoulder 89 which defines one limited range of gear ratios commonly identified with a "3". Detent recess 80C presents a shoulder 90 which defines the further limited range of gear ratios commonly identified with a "2", and detent recess 80D presents a shoulder 91 which defines the most limited range of gear ratios commonly identified with a "1". Extending outwardly from shoulder 88 in detent recess 80A is still another detent recess that is identified as recess 80E. Detent recess 80E terminates in a shoulder 92 that defines the reverse drive ratio, commonly identified with an "R".

Referring now more particularly to FIGS. 6 through 8, it can be seen that the actuating subassembly 25 may be conveniently supported by a pair of laterally spaced mounting walls 95A and 95B presented from the transmission casing, a portion of which is identified by the numeral 96 in FIGS. 6 and 6A.

A clevis bracket 98 is affixed to the first mounting wall 95A, and a pivot pin 99 is carried by the clevis bracket 98 to support a second rocker 100 for pivotal movement. One end portion 101 of the rocker 100 is operatively attached to the second force transfer device 60 so that manipulation of the selecting lever 45 to pivot the first rocker 55 incorporated in the selector subassembly 20 will effect concomitant pivotal movement of the second rocker 100 in the actuating subassembly 25. A displacing pin 102 extends laterally outwardly from the throw arm 103 of the second rocker 100 to be interposed between and in contiguous juxtaposition with a pair of axially spaced collars 105A and 105B secured to a shift shaft 106. The shift shaft 106 is rotatable with respect to and axially translatable through the first and second mounting walls 95A and 95B.

As depicted, a sleeve bearing 108 is secured within a bore 109 which penetrates wall 95A, and the shift shaft 106 is supported within that sleeve bearing 108. An annular seal 110 may also circumscribe the shift shaft 106 to interact with a cylindrical countersunk depression 111 coaxially disposed with respect to the bore 109. The seal 110 thus precludes the passage of undesired fluids to and from the interior cavity 112 of the transmission casing 96. A second sleeve bearing 113 is secured within a bore 114 which penetrates wall 95B, and the shift shaft 106 is also supported within that sleeve bearing 113. Depending upon the location of the mounting wall, a seal means may or may not be required in association with the second mounting wall 95B. In any event, pivotal movement of the rocker 100 will effect axial translation of the shift shaft 106 by driving the displacing pin 102 against one or the other of the collars 105A or 105B.

One end portion of the shift shaft 106 is located interiorly of the mounting wall 95B of the transmission casing 96 is preferably provided with an annular groove 116 within which a snap ring 118 may be received to preclude the shift shaft 106 from being inadvertently removed from its axially sliding disposition through the bushings 108 and 113 in mounting walls 95A and 95B, respectively. A crank arm 120 is secured to the other end portion of the shift shaft 106 located exteriorly of the mounting wall 95A of the transmission casing 96. The distal end portion 122 of the crank arm 120 is operatively connected, as at 123, to the first force transfer device 50, which is operatively connected to the longitudinal throw arm 49 in the manual selector subassembly 20. As such, angular displacement of the throw arm 49 in the longitudinal direction applies a force to the shift shaft 106 which tends to effect rotation of the shift shaft 106.

A bracket 125 is secured to the second mounting wall 95B, as by the machine screw 126 depicted, and the bracket 125 has three arms 128, 129 and 130. The first arm 128 extends between a pair of substantially parallel laterally adjacent actuating plates 131 and 132 that are rotatably mounted on the shift shaft 106 and circumferentially recessed, as at 133 and 134, respectively, to receive the first arm 128 of the bracket 125. The distal end portion 135 of the first arm 128 in penetrated by a transverse bore 136. The diameter of the bore 136 is selected so as to receive an immobilizing ball 138 for unrestrained movement transversely of the first arm 128, but to preclude movement of the immobilizing ball 138 in any other direction.

The first and second actuating plates 131 and 132 are each provided with a conical recess 139 and 140, respectively. The diameter of the immobilizing ball 138 is chosen so that only one actuating plate 131 or 132 can be moved at a time. That is, the first actuating or shift plate 131 can only be rotated if the immobilizing ball 138 is received in the transverse bore 136 and the conical recess 140 in the second actuating or park plate 132. Conversely, the second actuating plate 132 can only be rotated when the immobilizing ball 138 is received in the transverse bore 136 and the conical recess 139 in the first actuating plate 131. This immobilizing effect, how it is accomplished and under what circumstances, will be discussed in greater detail during the explanation as to the operation of the subject drive range selection assembly.

The second arm 129 on the bracket 125 is disposed in parallel relation to at least the second actuating plate 132 and supports a dog 141 that is effectively interactive between the second arm 129, the shift shaft 106 and the second actuating plate 132. Specifically, the dog 141 has a first leg 142 that is closely fitted to be received in an annular recess 143 which circumscribes the shift shaft 106. The dog 141 also has a second leg 144 that is axially slidable through a bore 145 in the second arm 129 of the bracket 125 to be received in a locking aperture 146 provided in the web portion 148 of the second actuating plate 132. As such, the second actuating plate 132 cannot be rotated with respect to the shift shaft 106 unless the shift shaft 106 has been axially translated to disengage the second leg 144 of the dog 141 from the locking aperture 146 in the web portion 148 of the second actuating plate 132. The second arm 129 may, depending upon its overall configuration, also include a bore 147 through which the shift shaft 106 can, as depicted, be movably received.

The third arm 130 of the bracket 125 extends outwardly in parallel relation to the axis of the shift shaft 106 to present an anchor post 149 against which one end 150 of a torsion spring 151 may react. The second end 152 of the torsion spring 151 is operatively engaged within a notch 153 in one edge of the throw arm 154 that extends radially outwardly from the second actuating or park plate in order to continuously apply a rotational biasing force against the second actuating plate 132 in the direction of the arrow "A" in FIG. 7, also for a purpose more fully hereinafter explained.

With continued reference to FIG. 7, a first link arm 155 is connected between a bore 156 in the throw arm 154 and a parking pawl mechanism of the type well known in the art, and which is, therefore, represented by block 158. As depicted in FIG. 8, a second link arm 160 is attached to a bore 161 in a throw arm 162 which extends outwardly from the first actuating plate 131. The second link arm 160 is connected to a conventional rooster tail arrangement of a standard manual shift valve, which is, therefore, represented by block 163, in order to activate the neutral, reverse and forward drive ranges, as desired. The positioning of the manual valve is controlled in a conventional manner by cam lobes on the rooster tail and a spring actuated roller.

Referring again to FIGS. 6 and 6A, a compression spring 165 is interposed between the first mounting wall 95A and a reaction washer 166 that is secured to the shift shaft 106 against movement in at least one direction by a spring clip 168 received in an annular groove 169 in the shift shaft 106. When so positioned, the compression spring 165 will constantly bias the shift shaft 106 to displace axially inwardly of the transmission casing 96, the purpose for which will also be more fully hereinafter apparent.

As represented in FIGS. 6, 6A, 7 and 8, one last, but extremely important structural interconnection between the shift shaft 106 and the shift plates 131 and 132, comprises a stub pin key 170 which extends radially outwardly from the shift shaft 106 to be received within one or the other of the keyways 171 or 172 provided in the hub portions of the first and second shift plates 131 and 132, respectively. When the shift shaft 106 is displaced to its axially innermost disposition, as depicted in FIG. 6, the pin key 170 will be received within keyway 171, thereby establishing that the first actuating plate 131 will be rotatable only with the shift shaft 106. When the pin key 170 is so disposed, there is no operative means by which the second actuating plate 132 can be rotated in response to rotation of the shift shaft 106. Thus, relative rotation between the shift shaft 106 and the second actuating plate 132 is thereby achieved On the other hand, when the shift shaft 106 is axially displaced to its axially outermost disposition, as depicted in FIG. 6A, the pin key 170 will be received within the keyway 172, thereby establishing that the second actuating plate 132 will be rotatable only with the shift shaft 106. When the pin key 170 is so disposed, there is no operative means by which the first actuating plate 131 can be rotated in response to rotation of the shift shaft 106. Thus, relative rotation between the shift shaft 106 and the first actuating plate 131 is thereby achieved. The means by which, and the functional reasons for which, the actuating plates 131 and 132 are selectively so connected to and selectively disconnected from the shift shaft 106, will be explained in detail in conjunction with the operation of the drive range selection mechanism 10.

Operation

The following explanation, which is directed to the operation of a drive range selection mechanism embodying the concepts of the present invention, will begin with the "neutral" position. When the selecting lever 45 is disposed in the neutral position "N", as depicted in FIG. 5, the pawl 79 engages the stop shoulder 86 (FIG. 2) and the knuckle assembly 40 is disposed in the orientation depicted in FIGS. 1 and 4. With the selecting lever 45 in the neutral position, the first rocker 55—which is incorporated in the manual selector subassembly 20, as depicted in FIG. 4—ensures (through the second force transfer device 60) that the second rocker 100, which is incorporated in the actuating subassembly 25, is disposed as depicted in FIG. 6.

The combined interaction of the displacing pin 102 with the collars 105A and 105B, as well as the biasing action of the compression spring 165 against the reaction washer 166, effectively secures the shift shaft 106 in the position depicted in FIG. 6. As such, the leg 144 of the dog 141 is received within the locking aperture 146 positively to lock the second actuating or brake plate 132 against rotation. At the same time, the pin key 170 is received within the keyway 171 to assure that the first actuating or shift plate 131 will rotate only with the shift shaft 106.

To shift into the drive range "D" the operator need only move the selecting lever 45 to the position "D" in the longitudinal portion 82 of the gate plate aperture 83 in the gate plate 81. Without depressing the button 71, the pawl 79 is permitted to slide along the detent recess 80A between the stop shoulders 86 and 88. When the pawl 79 engages stop shoulder 86 the neutral position "N" is selected, and when the pawl 79 engages stop shoulder 88 the drive range position "D" is selected. While the detent arch 65 defines the stop positions for the selecting lever 45, the hydraulic condition is determined by the manual valve, as explained above.

No lateral movement of the selecting lever 45 is either required or permitted in order to accommodate this movement of the selecting lever 45. As a result, the knuckle assembly 40 does not move. The selecting lever 45 can only pivot about the second axis 44 to effect a concomitant pivotal movement of the throw arm 49 to effect a displacement that is transferred through the first force transfer device 50 to crank arm 120, thereby rotating the shift shaft 106. The angular rotation of the selecting lever 45 required to move the pawl from its engagement with the stop shoulder 86 to its engagement with the stop shoulder 88 is sufficient to effect that rotation of the actuating plate 131 required to displace the manual shift valve 163 from neutral "N" into the full forward drive range "D".

Rotation of the actuating plate 131 by movement of the selecting lever 45 from the neutral position "N" to the drive range "D" confines the immobilizing ball 138 within the bore 136 through the first arm 128 of the bracket 125 and into the conical recess 140 in the second actuating plate 132, thereby further assuring that the second actuating or brake plate 132 is precluded from rotation when it is disconnected from the shift shaft 106.

Continued movement of the selecting lever 45 into the consecutive limited forward drive ranges "3", "2" and "1" is accomplished by depressing the button 71 to displace the pawl 79 sufficient to slide sequentially along the successive detent recesses 80B, 80C or 80D to engage the respective shoulders 89, 90 or 91. The degree of angular rotation required for the pawl 79 to engage the successive shoulders 89, 90 or 91 comports with the degree of angular rotation required for the first actuating, or shift, plate 131 to displace the manual shift valve 163 progressively to select the drive ranges designated as "3", "2" and "1".

To shift into reverse, the selecting lever 45 is angularly rotated about the second axis 44 to bring it back to the neutral position "N". Sufficient depression of the button 71 will allow the pawl 79 to disengage from the shoulder 88 and slide along detent recess 80E to engage stop shoulder 92. Here, too, there is no lateral movement of the selecting lever 45, and the resulting retro-displacement of the shift valve 163 effects operation in the reverse drive range.

To move into the park position, however, entails sequential lateral and then longitudinal manipulation of the selecting lever 45. With the selecting lever 45 disposed in neutral position "N" (FIG. 5), the selecting lever 45 is first rotated about the first axis 39 to move across the lateral portion 84 of the aperture 83 in the gate plate 81. This lateral movement of the selecting lever 45 also effects rotation of the bearing block 41 in knuckle assembly 40 about the first axis 39 to swing the throw arm 52 and thereby pivot the first rocker 55 in the selector subassembly 20 from the position depicted in FIG. 4 to the position depicted in FIG. 4A.

The aforesaid pivotal movement of the first rocker 55 effects a concomitant pivotal movement of the second rocker 100 (located in the actuating subassembly 25) by virtue of the force transfer device 60 which operatively connects the first and second rockers 55 and 100. The relative positions of the first rocker 55 are seen by a comparison of the dispositions depicted in FIGS. 4 and 4A, and the relative positions of the second rocker 100 in response to movement of the first rocker 55 from the position depicted in FIG. 4 to the position depicted in FIG. 4A are seen by a comparison of the dispositions of the second rocker 100 depicted in FIGS. 6 and 6A.

With continued reference to FIGS. 6 and 6A, as the second rocker 100 pivots, it effects axial translation of the shift shaft 106, and that axial translation of the shift shaft 106 not only removes the leg 144 of dog 141 from the aperture 146 in the web portion 148 of the second actuating or brake plate 132 but also transfers engagement of the pin key 170 from the keyway 171 in the first actuating plate 131 to the keyway 172 in second actuating plate 132.

After the selecting lever 45 has been laterally displaced along the full extent of the lateral portion 84 in the gate plate aperture 83, the selecting lever 45 will be longitudinally aligned with the second longitudinal portion 85, such that depressing the button 71 allows the pawl 79 to clear the stop shoulder 86 which defines the neutral position "N" of the selecting lever 45 so that the selecting lever 45 may be pivoted within the second longitudinal portion 85 of the aperture 83 in the gate plate 81. It should be appreciated that the torsion spring 151, in fact, virtually accomplishes this movement of the selecting lever 45 with relatively little, if any, assistance by the vehicle operator. This movement of the selecting lever 45 swings the throw arm 49 in the selector subassembly 20 about the second axis 44 to effect rotation of the crank arm 120, and thereby rotation of the shift shaft 106. The interaction of the actuating plate 132 with the shift shaft 106, when the shift shaft 106 is disposed as depicted in FIG. 6A, rotates the second actuating, or brake, plate 132.

Rotation of the second actuating plate 132 causes the conical recess 140 in actuating plate 132 to serve as a cam by which to displace the immobilizing ball 138 outwardly of the conical recess 140. So displaced, the ball 138 will be located within the bore 136 through the first arm 128 of the bracket 125 and also within the conical recess 139 in the first actuating, or shift, plate 131 which was operatively disconnected from the selector sub assembly 20 by lateral manipulation of the selecting lever 45.

Rotation of the second actuating plate 132 displaces the first link arm 155, which is assisted by the biasing action of the torsion spring 151 to operate the parking pawl mechanism 158. The torsion spring 151 and the lost motion arrangement built into the parking pawl mechanism 158 cooperate to accommodate any momentary obstruction to the engagement of the parking pawl mechanism 158, as is well known to the art.

To return to neutral "N" from park "P", the operator first swings the selecting lever 45 longitudinally against the biasing action of spring 151 until the selecting lever 45 is located within the lateral portion 84 of the gate plate 81. When the selecting lever 45 is so located, the biasing action of spring 165 assists in laterally moving the selecting lever 45 to the neutral position "N". The biasing action of spring 165 also maintains the selecting lever 45 in the neutral position "N", and precludes the selecting lever 45 from moving within the lateral portion 84 of the gate plate aperture 83 unless the operator applies the modest force necessary to overcome the spring 165.

As should now be apparent, a drive range selection assembly 10 embodying the concepts of the present invention will not only effect a disconnection of the drive range shift actuating mechanism when the park actuating mechanism is operatively connected to the selector subassembly 20, and vice versa, but also effects a locking of the disconnected actuating mechanism and accomplishes the other objects of the invention.

The embodiments of the invention in which an exclusive property or privilege is claimed are defined as follows:

1. A drive range selection assembly comprising:
   a movable shift actuating member operatively connected to a manual shift valve;
   a movable park actuating member operatively connected to a parking pawl mechanism;
   a selecting lever;
   force transfer means operatively connected to said shift actuating member and said park actuating member to effect selective movement thereof in response to manipulation of said selecting lever;
   means to disengage said force transfer means from said shift actuating member when said force transfer means is operatively connected to said park actuating member;
   means to immobilize said shift actuating member in response to movement of said park actuating member when said force transfer means is disengaged from said shift actuating member;
   means to disengage said force transfer means from said park actuating member when said force transfer means is operatively connected to said shift actuating member; and
   means to preclude movement of said park actuating member when said force transfer device is operatively connected to said shift actuating member.

2. A drive range selection assembly, as set forth in claim 1, wherein:
   said shift actuating member and said park actuating member are mounted for rotatable movement.

3. A drive range selection assembly, as set forth in claim 2, further comprising:
   a shift shaft;
   said shift actuating member and said park actuating member being mounted for selective rotation with and with respect to said shift shaft;
   said shift shaft being supported for rotation and axial translation;
   said force transfer means operatively attached to said shift shaft to effect selective translation and independent selective rotation of said shift shaft in response to manipulation of said selecting lever.

4. A drive range selection assembly, as set forth in claim 3, further comprising:
   means selectively to effect operative engagement between said shift shaft and said shift actuating member in response to axial displacement of said shift shaft in one direction and to effect operative engagement between said shift shaft and said park actuating member in response to axial displacement of said shift shaft in the opposite direction.

5. A drive range selection assembly, as set forth in claim 4, wherein said means selectively to effect operative engagement between said shift shaft and said shift actuating member as well as between said shift shaft and said park actuating member comprises:
   a pin key extending outwardly from said shift shaft selectively to engage said shift actuating member or said park actuating member in response to axial translation of said shift shaft.

6. A drive range selection assembly, as set forth in claim 5, wherein said means to immobilize said shift actuating member in response to movement of said park actuating member when said force transfer means is disengaged from said shift actuating member and said means to preclude movement of said park actuating member when said force transfer device is operatively connected to said shift actuating member comprises:
   a first cavity recessed into said shift actuating member;
   a second cavity recessed into said park actuating member and being positioned to lie in opposition to said first cavity when neither of said actuating members have been activated;
   fixedly located arm means interposed between said shift actuating member and said park actuating member;
   a bore extending through said arm means in register with said first and said second cavities;
   an immobilizing ball received in said bore;
   said immobilizing ball having a diameter that permits it to be fully received within said bore and simultaneously within either one of said recesses.

7. A drive range selection assembly, as set forth in claim 4, wherein:
   said selecting lever is selectively movable longitudinally and laterally;
   and axial displacement of said shift shaft is achieved by one force transfer means in response to lateral displacement of said selecting lever.

8. A drive range selection assembly, as set forth in claim 7, wherein:

rotation of said shift shaft is achieved by an independent force transfer means in response to longitudinal movement of said selecting lever.

9. A drive range selection assembly, as set forth in claim 8, wherein:

a knuckle assembly is mounted for movement about a first axis;

said selecting lever is mounted on said knuckle assembly for longitudinal movement relative to said knuckle assembly about a second axis that is oriented orthogonally with respect to said first axis and for lateral movement with said knuckle about said first axis;

movement of said selecting lever with respect to said knuckle assembly effecting rotation of said shift shaft;

and movement of said selecting lever with said knuckle assembly effecting axial translation of said shift shaft.

10. A drive range selection assembly, as set forth in claim 9, wherein:

longitudinal and lateral movement of said selecting lever is controlled by a gate plate.

11. A drive range selection assembly, as set forth in claim 8, further comprising: one biasing means to at least assist the movement of said park actuating member for activation of said parking pawl mechanism.

12. A drive range selection assembly, as set forth in claim 11, further comprising:

another biasing means to assist the axial displacement of said shift shaft toward operative engagement with said shift actuating member.

13. A drive range selection assembly comprising:

a rotatably mounted shift actuating plate operatively connected to a shift valve;

a rotatably mounted park actuating plate operatively connected to a parking pawl;

a selecting lever;

force transfer means operatively connected to said shift actuating plate and said park actuating plate to effect selective rotation thereof in response to manipulation of said selecting lever;

means to disengage said force transfer means from said shift actuating plate when said force transfer means is operatively connected to said park actuating plate;

means to immobilize said shift actuating plate in response to rotation of said park actuating plate when said force transfer means is disengaged from said shift actuating plate;

means to disengage said force transfer means from said park actuating plate when said force transfer means is operatively connected to said shift actuating plate; and means to preclude rotation of said park actuating plate when said force transfer means is operatively connected to said shift actuating plate.

14. A drive range selection assembly comprising:

a selecting means for actuating first and second force transfer devices in response to selected manipulation of said selecting means;

a shift shaft mounted for rotation and axial translation;

said shift shaft operatively connected to said first force transfer device to rotate in response to longitudinal movement of said selecting means;

said shift shaft operatively connected to said second force transfer device to translate axially in response to lateral manipulation of said selecting means;

first and second actuating plates mounted on said shift shaft for rotation with and with respect to said shift shaft;

a shift valve;

first link means operatively connecting said first actuating plate to said shift valve;

second link means operatively connecting said second actuating plate to a parking pawl;

means selectively to effect a driving connection between said shift shaft and said first and second actuating plates in response to axial translation of said shift shaft;

means to preclude rotation of said second actuating plate when a driving connection is effected between said shift shaft and said first actuating plate; and means to preclude rotation of said first actuating plate when said second actuating plate has been retracted to operate said parking pawl.

* * * * *